US011964775B2

(12) United States Patent
Akanuma et al.

(10) Patent No.: US 11,964,775 B2
(45) Date of Patent: Apr. 23, 2024

(54) MOBILE OBJECT, INFORMATION PROCESSING APPARATUS, INFORMATION PROCESSING METHOD, AND PROGRAM (71) Applicant: SONY GROUP CORPORATION, Tokyo (JP)

(72) Inventors: Erio Akanuma, Kanagawa (JP); Keisuke Maeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 67 days.

(21) Appl. No.: 17/632,426

(22) PCT Filed: Jun. 30, 2020

(86) PCT No.: PCT/JP2020/025657
§ 371 (c)(1),
(2) Date: Feb. 2, 2022

(87) PCT Pub. No.: WO2021/039100
PCT Pub. Date: Mar. 4, 2021

(65) Prior Publication Data
US 2022/0274717 A1    Sep. 1, 2022

(30) Foreign Application Priority Data

Aug. 27, 2019 (JP) ................. 2019-154709

(51) Int. Cl.
B64D 45/08 (2006.01)
B64C 39/02 (2023.01)
(Continued)

(52) U.S. Cl.
CPC ............ *B64D 45/08* (2013.01); *B64C 39/024* (2013.01); *G05D 1/0676* (2013.01); *G05D 1/101* (2013.01);
(Continued)

(58) Field of Classification Search
CPC .... B64D 45/08; B64C 39/024; G05D 1/0676; G05D 1/101; G06V 10/62; G06V 20/17;
(Continued)

(56) References Cited

U.S. PATENT DOCUMENTS

2017/0283038 A1* 10/2017 Lin .................. B64C 39/024
2019/0220039 A1*  7/2019 Wu .................. B64D 47/08

FOREIGN PATENT DOCUMENTS

JP   2016-085169 A    5/2016
JP   2017-530043 A   10/2017
(Continued)

OTHER PUBLICATIONS

Machine Translation WO 2018020656 (Year: 2018).*

*Primary Examiner* — Anne Marie Antonucci
*Assistant Examiner* — Jodi Marie Jones
(74) *Attorney, Agent, or Firm* — Paratus Law Group, PLLC (57) ABSTRACT Proposed are a mobile object, an information processing apparatus, an information processing method, and a program that are capable of improving the accuracy of determining whether to land a drone aircraft on a landing surface. The mobile object of the present technology includes a control unit. The control unit calculates a temporal change of a landing surface from images in which the landing surface for the mobile object is imaged in time series by an imaging unit of the mobile object in a hovering state, and determines whether to land the mobile object on the landing surface on the basis of the calculated temporal change.

13 Claims, 7 Drawing Sheets (51) Int. Cl.
  *B64U 101/30* (2023.01)
  *G05D 1/00* (2006.01)
  *G05D 1/06* (2006.01)
  *G05D 1/10* (2006.01)
  *G06V 10/62* (2022.01)
  *G06V 20/17* (2022.01)

(52) U.S. Cl.
  CPC .............. *G06V 10/62* (2022.01); *G06V 20/17* (2022.01); *B64U 2101/30* (2023.01); *B64U 2201/10* (2023.01)

(58) Field of Classification Search
  CPC ..................... B64U 2101/30; B64U 2201/10; B64U 70/00; G08G 5/0091; G08G 5/025; G08G 5/0021
  See application file for complete search history.

(56) References Cited

FOREIGN PATENT DOCUMENTS

| WO | WO-2018020656 A1 | * | 2/2018 | ............. B64C 39/02 |
|----|------------------|---|--------|--------------------------|
| WO | WO-2018027338 A1 | * | 2/2018 | ........... B64C 39/024 |

* cited by examiner

MOBILE OBJECT, INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2020/025657 (filed on Jun. 30, 2020) under 35 U.S.C. § 371, which claims priority to Japanese Patent Application No. 2019-154709 (filed on Aug. 27, 2019), which are all hereby incorporated by reference in their entirety.

TECHNICAL FIELD

The present technology relates to a mobile object, an information processing apparatus, an information processing method, and a program.

BACKGROUND ART

It has been recently proposed to utilize a drone aircraft equipped with a camera, for example, in aerial shooting of a landscape or the like. In such a drone aircraft, a technique of determining an environment of a landing surface from an image of the landing surface is employed when a landing operation is performed (for example, Patent Literature 1).

CITATION LIST

Patent Literature

Patent Literature 1: Japanese Unexamined Patent Application Publication (Translation of PCT Application) No. 2017-530043

DISCLOSURE OF INVENTION

Technical Problem

However, in the technique described in Patent Literature 1, it is necessary to determine whether to land the drone aircraft mainly from the image information of the landing surface, and there are cases where the determination is erroneous.

In this regard, the present technology proposes a mobile object, an information processing apparatus, an information processing method, and a program that are capable of improving the accuracy of determination as to whether to land a drone aircraft on a landing surface.

Solution to Problem

In order to solve the above problem, a mobile object according to an embodiment of the present technology includes a control unit.

The control unit calculates a temporal change of a landing surface from images in which the landing surface for the mobile object is imaged in time series by an imaging unit of the mobile object in a hovering state, and determines whether to land the mobile object on the landing surface on the basis of the calculated temporal change.

The mobile object may further include a detection unit that detects an altitude of the mobile object from the landing surface. The control unit may determine whether to land the mobile object on the landing surface on the basis of the altitude and the temporal change.

The control unit may perform image processing on the images to remove objects different from the landing surface, and calculate the temporal change from the images on which the image processing is performed.

The control unit may cause the mobile object to approach the landing surface when the altitude of the mobile object is larger than a predetermined threshold value.

The threshold value may be an altitude at which the landing surface changes with time due to wind generated from the mobile object.

The control unit may discriminate an environment of the landing surface on the basis of the images, and determine whether to land the mobile object on the landing surface on the basis of the discriminated environment, the temporal change, and the altitude.

The control unit may land the mobile object on the landing surface when the temporal change exceeds a threshold value corresponding to the discriminated environment.

The control unit may land the mobile object on the landing surface when the discriminated environment is a water surface and when the temporal change is equal to or less than a threshold value corresponding to the water surface.

The mobile object may be a flying object.

In order to solve the above problem, an information processing apparatus according to an embodiment of the present technology includes a control unit.

The control unit calculates a temporal change of a landing surface from images in which the landing surface for a mobile object is imaged in time series by an imaging unit of the mobile object in a hovering state, determines whether to land the mobile object on the landing surface on the basis of the calculated temporal change, and outputs a result of the determination to the mobile object.

The information processing apparatus may be a server.

In order to solve the above problem, an information processing method according to an embodiment of the present technology includes: calculating a temporal change of a landing surface from images in which the landing surface for a mobile object is imaged in time series by an imaging unit of the mobile object in a hovering state; and determining whether to land the mobile object on the landing surface on the basis of the calculated temporal change.

In order to solve the above problem, a program according to an embodiment of the present technology causes a mobile object or an information processing apparatus to execute the following steps of: calculating a temporal change of a landing surface from images in which the landing surface for the mobile object is imaged in time series by an imaging unit of the mobile object in a hovering state; and determining whether to land the mobile object on the landing surface on the basis of the calculated temporal change.

MODE(S) FOR CARRYING OUT THE INVENTION

Hereinafter, embodiments of the present technology will be described with reference to the drawings.

First Embodiment

[Configuration of Information Processing System]

Figure 1:
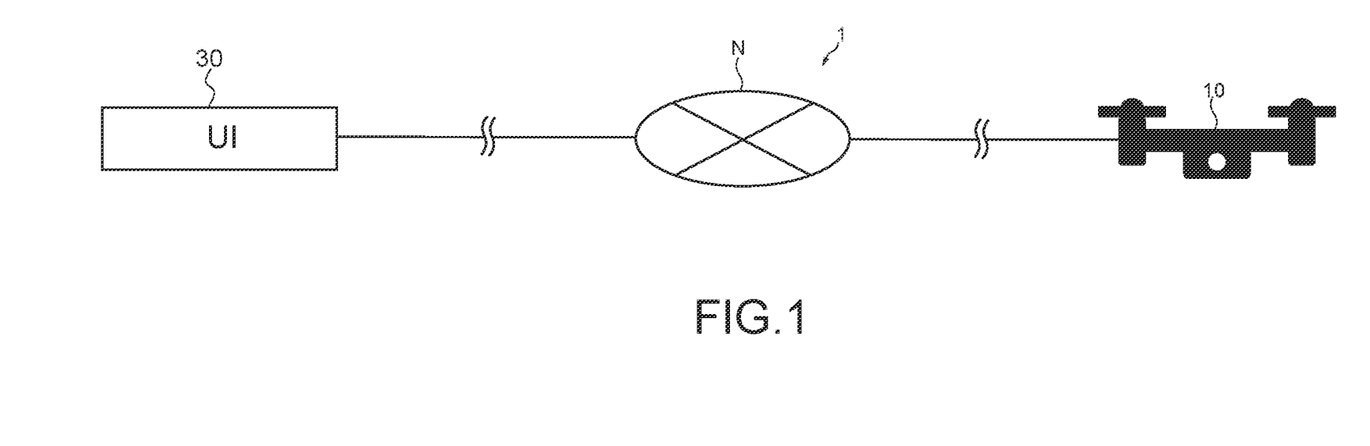
FIG. 1 is a schematic diagram showing a configuration example of an information processing system according to a first embodiment of the present technology.
Figure 2:
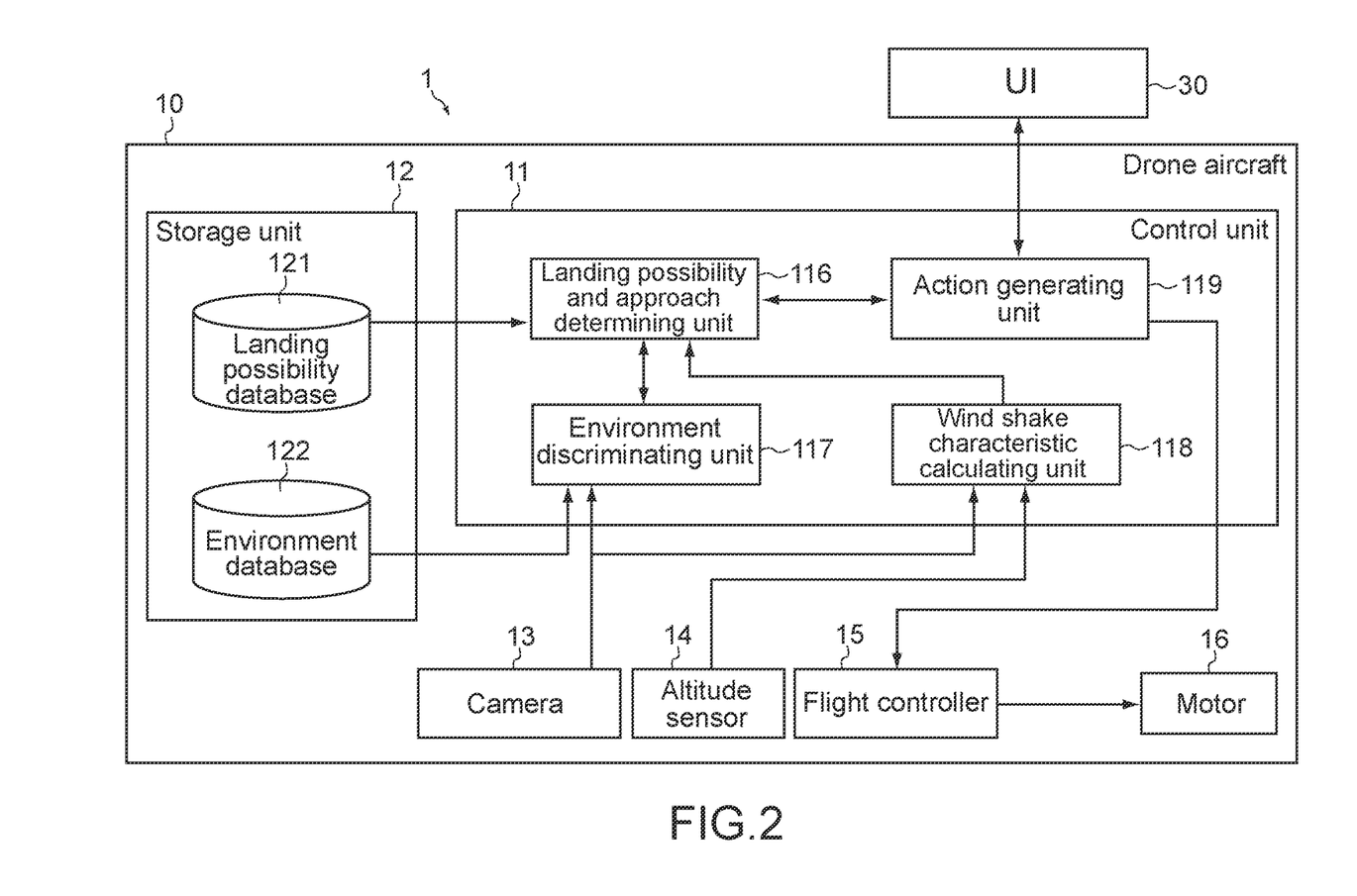
FIG. 2 is a block diagram showing a configuration example of the information processing system.

FIG. 1 is a schematic diagram showing a configuration example of an information processing system 1 according to a first embodiment. FIG. 2 is a block diagram showing a configuration example of the information processing system 1. The information processing system 1 includes a drone aircraft 10 and a user interface (UI) 30 as shown in FIG. 2.

The drone aircraft 10 and the UI 30 are connected to each other so as to be able to communicate with each other via a network N. The network N may be the Internet, a mobile communication network, a local area network, or the like, and may be a network in which a plurality of types of networks is combined.

(Drone Aircraft)

As shown in FIG. 2, the drone aircraft 10 includes a control unit 11, a storage unit 12, a camera 13, an altitude sensor 14, a flight controller 15, and a motor 16. The drone aircraft 10 is an example of a "mobile object" in the Claims.

The control unit 11 controls the entire operation of the drone aircraft 10 or a part thereof in accordance with a program stored in the storage unit 12. The control unit 11 functionally includes a landing possibility and approach determining unit 116, an environment discriminating unit 117, a wind shake characteristic calculating unit 118, and an action generating unit 119.

The landing possibility and approach determining unit 116 determines whether or not the drone aircraft 10 can land on the ground at the current position without breakage. Here, the breakage means that the drone aircraft 10 is, after landing, turned upside down from a landing point because of poor footing at the point and is damaged. The same applies to the following description.

The environment discriminating unit 117 refers to an environment database 122 to discriminate an environment of the ground at the current position of the drone aircraft 10 from a captured image of the landing surface for the drone aircraft 10, which is captured by the camera 13.

The wind shake characteristic calculating unit 118 performs predetermined image processing on the images of the landing surface, which are captured by the camera 13 in time series, and calculates a temporal change of the landing surface as a wind shake characteristic value. The temporal change is, for example, a temporal change of the shape of the landing surface imaged by the camera 13. Here, the "wind shake characteristic value" is a numerical value indicating how much the physical shape changes over time when the landing surface receives natural wind (trade wind, westerlies, polar easterlies, seasonal wind, local wind, etc.) or wind from the drone aircraft 10. The same applies to the following description.

The action generating unit 119 controls the UI 30 and the flight controller 15 on the basis of an instruction from the landing possibility and approach determining unit 116. For example, when receiving an instruction to land the drone aircraft 10 from the UI 30, the action generating unit 119 outputs the instruction to the flight controller 15.

As shown in FIG. 2, the storage unit 22 functionally includes a landing possibility database 121 and an environment database 122.

Figure 5:
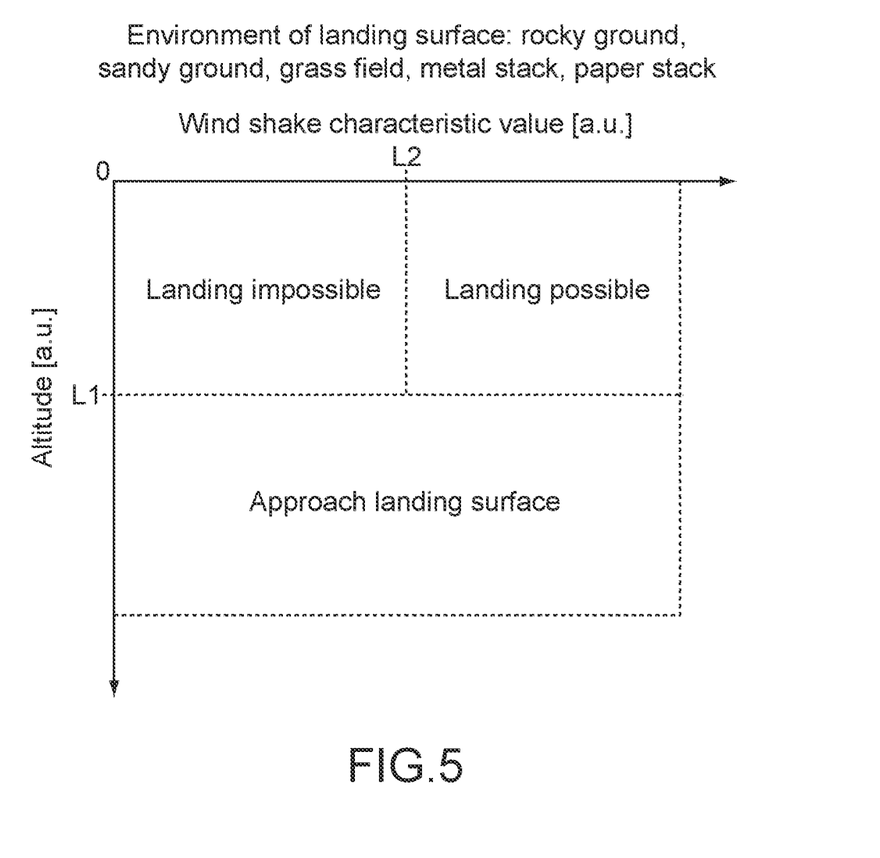
FIG. 5 is a graph showing an example of a determination index as to whether to land the drone aircraft on a landing surface.
Figure 6:
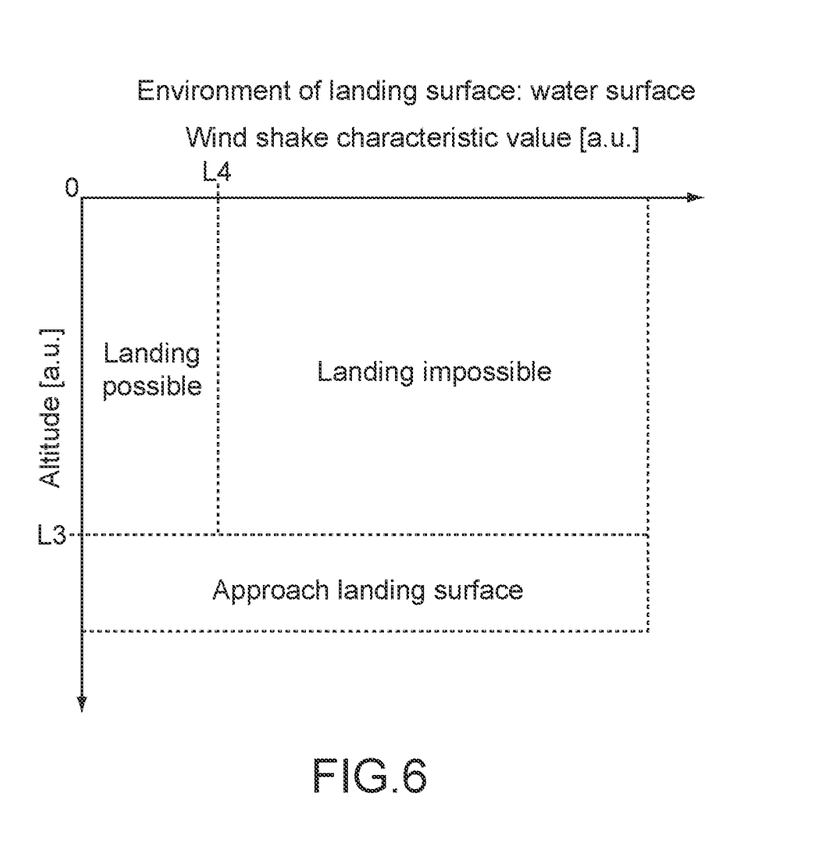
FIG. 6 is a graph showing an example of a determination index as to whether to land the drone aircraft on a landing surface.

The landing possibility database 121 stores a determination index as to whether to land the drone aircraft 10 on the ground or whether to cause the drone aircraft 10 to approach the ground (FIGS. 5 and 6). Such a determination index corresponds to the wind shake characteristic value and the altitude of the drone aircraft 10. The landing possibility and approach determining unit 116 determines the operation to be taken by the drone aircraft 10 on the basis of whether or not those values exceed a predetermined threshold value.

The environment database 222 stores data (hereinafter, referred to as reference data) in which an image of a landing surface that has been captured in advance by the camera 13 is associated with information regarding the environment of the landing surface appearing in the image (e.g., sandy ground, grass field, rocky ground, water surface, etc.).

The camera 13 is a camera that captures an image in the landing surface direction (vertical downward direction) with respect to the drone aircraft 10. The camera 13 favorably has a resolution at which an object on the landing surface can be discriminated. The camera 13 outputs images continuous in time series rather than a single image to the environment discriminating unit 117 and the wind shake characteristic calculating unit 118 during operation. The camera 13 is an example of the "imaging unit" in the Claims.

The altitude sensor 14 is a sensor that detects the altitude of the drone aircraft 10 from the landing surface. The altitude sensor 14 may be a distance sensor that detects the altitude from the landing surface using infrared rays or ultrasonic waves, or it may be an atmospheric pressure sensor. Alternatively, the drone aircraft 10 may be a sensor in which a distance sensor and an atmospheric pressure sensor are combined.

The flight controller 15 is a board for controlling the posture of the drone aircraft 10. The flight controller 15 includes a microcontroller and an inertial measurement unit (IMU). The flight controller 15 executes arithmetic processing in the microcontroller on the basis of the data from the control unit 11, and controls the drone aircraft 10 to have an appropriate posture on the basis of a command acquired from the UI 30.

The motor 16 controls the rotational speed of the propellers of the drone aircraft 10. The motor 16 may be, for example, a brush motor or a brushless motor, and any type thereof may be used.

The drone aircraft 10 may be of a fixed-wing aircraft type or a rotary-wing aircraft type. When the drone aircraft 10 is of a rotary-wing aircraft type, the drone aircraft 10 may be, for example, a tricopter, a quadcopter, a hexacopter, or an octocopter, and the type thereof is not limited.

(UI)

The UI 30 is an interface for exchanging information with the drone aircraft 10. The UI 30 is typically a graphical user interface (GUI) such as a smartphone, but is not limited thereto and may be, for example, a web user interface (WUI), a character user interface (CUI), a haptic interface, a touch interface, a batch interface, a perceptual user interface (PUI), a reflexive interface, a tangible user interface (TUI), a text user interface, a sound user interface, or a zooming interface.

(Hardware Configuration)

Figure 3:
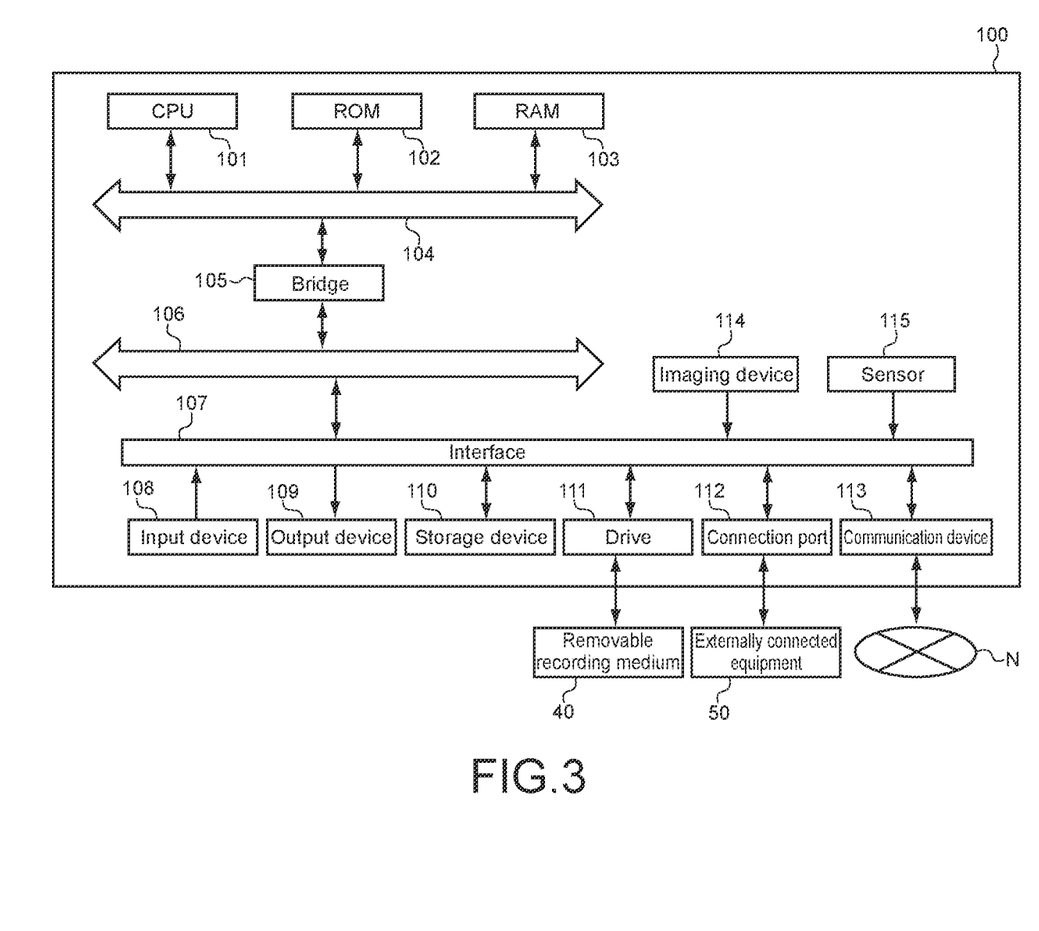
FIG. 3 is a block diagram showing a hardware configuration example of a drone aircraft and an information processing apparatus of the information processing system.

FIG. 3 is a block diagram showing an example of a hardware configuration of the drone aircraft 10 and an information processing apparatus 20. The drone aircraft 10 and the information processing apparatus 20 to be described later may be implemented by the information processing apparatus 100.

The information processing apparatus 100 includes a central processing unit (CPU) 101, a read only memory (ROM) 102, and a random access memory (RAM) 103. The control units 11 and 21 may be the CPU 101.

Further, the information processing apparatus 100 may include a host bus 104, a bridge 105, an external bus 106, an interface 107, an input device 108, an output device 109, a storage device 110, a drive 111, a connection port 112, and a communication device 113.

Furthermore, the information processing apparatus 100 may include an imaging device 114 and a sensor 115. The information processing apparatus 100 may include a processing circuit such as a digital signal processor (DSP), an application specific integrated circuit (ASIC), a field-programmable gate array (FPGA), or a graphics processing unit (GPU) instead of or together with the CPU 101.

The CPU 101 functions as an arithmetic processing unit and a control unit, and controls the overall operation of the information processing apparatus 100 or part thereof according to various programs recorded in the ROM 102, the RAM 103, the storage device 110, or on a removable recording medium 40. The storage units 12 and 22 may be the ROM 102, the RAM 103, the storage device 110, or the removable recording medium 40.

The ROM 102 stores programs to be used by the CPU 101, calculation parameters, and the like. The RAM 103 temporarily stores the programs to be used in the execution of the CPU 101, parameters that appropriately change in the execution of the programs, and the like.

The CPU 101, the ROM 102, and the RAM 103 are interconnected by a host bus 104 including an internal bus such as a CPU bus. In addition, the host bus 104 is connected via a bridge 105 to an external bus 106 such as a peripheral component interconnect/interface (PCI) bus.

The input device 108 is a device operated by a user, such as a mouse, a keyboard, a touch panel, a button, a switch, or a lever. The input device 108 may be, for example, a remote control device using infrared rays or other radio waves, or may be externally connected equipment 50 such as a mobile phone corresponding to the operation of the information processing apparatus 100.

The input device 108 includes input control circuits for generating input signals on the basis of information input by the user and outputting the generated input signals to the CPU 101. By operating the input device 108, the user inputs various types of data to the information processing apparatus 100 or instructs processing operations.

The output device 109 is configured by a device capable of notifying the user of the acquired information by using senses such as a sense of vision, a sense of hearing, and a sense of touch. The output device 109 may be, for example, a display device such as a liquid crystal display (LCD) or an organic electro-luminescence (EL) display, a sound output device such as a speaker or headphones, or a vibrator.

The output device 109 outputs the result acquired by the processing of the information processing apparatus 100 as a video such as a text or an image, a sound such as voice or audio, or vibration.

The storage device 110 is a data storage device configured as an example of a storage unit of the information processing apparatus 100. The storage device 110 is configured by, for example, a magnetic storage device such as a hard disk drive (HDD), a semiconductor storage device, an optical storage device, or a magneto-optical storage device. The storage device 110 stores, for example, programs to be executed by the CPU 101, various types of data, and various types of data acquired from the outside.

The drive 111 is a reader/writer for the removable recording medium 40 such as a magnetic disk, an optical disc, a magneto-optical disk, or a semiconductor memory, and is built in or externally attached to the information processing apparatus 100.

The drive 111 reads the information recorded on the removable recording medium 40 mounted thereon, and outputs the read information to the RAM 103. Further, the drive 111 writes a record on the removable recording medium 40 mounted thereon.

The connection port 112 is a port for connecting a device to the information processing apparatus 100. The connection port 112 may be, for example, a universal serial bus (USB) port, an IEEE1394 port, or a small computer system interface (SCSI) port.

Further, the connection port 112 may be an RS-232C port, an optical audio terminal, a high-definition multimedia interface (HDMI) (registered trademark) port, or the like. The externally connected equipment 50 is connected to the connection port 112, and thus various types of data can be exchanged between the information processing apparatus 100 and the externally connected equipment 50.

The communication device 113 is, for example, a communication interface including a communication device for connecting to the network N, or the like. The communication device 113 may be, for example, a communication card for a local area network (LAN), Bluetooth (registered trademark), Wi-Fi, or wireless USB (WUSB).

Further, the communication device 113 may be a router for optical communication, a router for asymmetric digital subscriber line (ADSL), or modems for various types of communication. The communication device 113 transmits and receives signals and the like to and from the Internet or other communication devices by using a predetermined protocol such as TCP/IP.

Further, the network N connected to the communication device 113 is a network connected in a wired or wireless manner and may include, for example, the Internet, a home LAN, infrared communication, radio wave communication, and satellite communication.

The imaging device 114 is, for example, a device for capturing an image of a real space using an image pickup device such as a complementary metal oxide semiconductor (CMOS) or a charge coupled device (CCD) and various members such as a lens for controlling a subject image to be formed on the image pickup device, and then generating a captured image. The imaging device 114 may capture a still image or may capture a moving image. The camera 13 corresponds to the imaging device 114.

The sensor 115 is, for example, various sensors such as an acceleration sensor, an angular velocity sensor, a geomagnetic sensor, an illuminance sensor, a temperature sensor, an atmospheric pressure sensor, and a sound sensor (microphone). The sensor 115 acquires information regarding a state of the information processing apparatus 100 itself, such as the posture of the housing of the information processing apparatus 100, and information regarding a surrounding environment of the information processing apparatus 100, such as brightness and noise around the information processing apparatus 100.

Further, the sensor 115 may also include a global positioning system (GPS) receiver that receives GPS signals to measure the latitude, longitude, and altitude of the device. The altitude sensor 14 corresponds to the sensor 115.

An example of the configuration of the information processing system 1 has been described above. Each of the constituent components described above may be configured by using a general-purpose member or may be configured by a member specialized for the function of each component. Such a configuration may be changed as appropriate according to the technical level at the time of implementation.

[Operation of Drone Aircraft]

Figure 4:
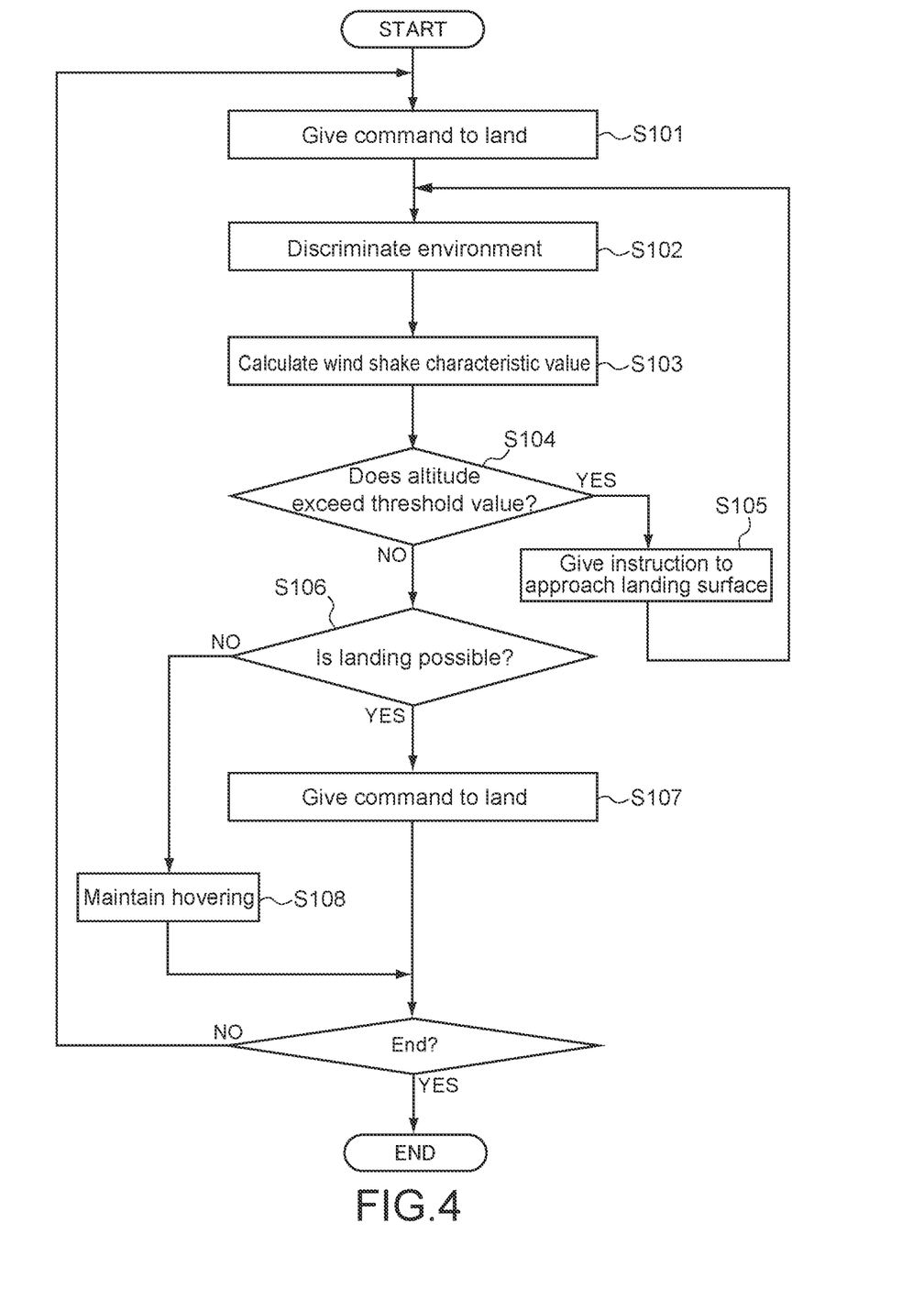
FIG. 4 is a flowchart showing a typical operation flow of the information processing system.

FIG. 4 is a flowchart showing a typical operation flow of the information processing system 1. Hereinafter, the operation of the drone aircraft 10 will be described with reference to FIG. 4 as appropriate.

(Step S101: Landing Command)

First, a user who operates the drone aircraft 10 outputs an instruction to land the drone aircraft 10 in a hovering state on the landing surface to the action generating unit 119 through the UI 30. In response to the instruction from the UI 30, the action generating unit 119 outputs an instruction to determine whether to land the drone aircraft 10 on the landing surface and further determine whether to cause the drone aircraft 10 to approach the landing surface, to the landing possibility and approach determining unit 116.

(Step S102: Discriminate Environment)

In response to the instruction from the action generating unit 119, the landing possibility and approach determining unit 116 outputs an instruction to discriminate the environment of the landing surface imaged by the camera 13 to the environment discriminating unit 117.

The environment discriminating unit 212 discriminates the environment of the landing surface from the images in which the landing surface is continuously imaged by the camera 13 at a predetermined frame rate by referring to the reference data stored in the environment database 122, and outputs the discrimination result to the landing possibility and approach determining unit 116.

(Step S103: Calculate Wind Shake Characteristic Value)

The wind shake characteristic calculating unit 118 performs image processing on the images continuously captured by the camera 13 to remove an object different from the landing surface in the image (for example, a mobile object such as a person, an insect, or a car). Specifically, the wind shake characteristic calculating unit 118 recognizes and removes a mobile object in an image in which the landing surface is imaged by, for example, a technique such as object detection or semantic segmentation using machine learning.

Next, the wind shake characteristic calculating unit 118 calculates the wind shake characteristic value of the landing surface in the image subjected to image processing. At that time, for example, the wind shake characteristic calculating unit 118 detects a feature point of the landing surface from the images in which the landing surface is continuously captured by the camera 13, and calculates a temporal change of the feature point between the frames as a wind shake characteristic value. Such a temporal change is, for example, a moving distance between the frames of the detected feature point.

The wind shake characteristic calculating unit 118 detects a feature point for each of a plurality of images in which the landing surface is imaged at a predetermined frame rate. The feature point is, for example, a point indicating a boundary between different regions in which at least one of the luminance, color, or distance has a value equal to or larger than a predetermined value, and corresponds to an edge (a point where the luminance changes abruptly), a corner (a black point or edge of the line segment is abruptly turned), or the like.

The wind shake characteristic calculating unit 118 detects a feature point from the image in which the landing surface is captured by image processing according to a predetermined algorithm such as scale invariant feature transform (SIFT), speed-up robust features (SURF), rotation invariant fast feature (RIFF), binary robust independent elementary features (BREIF), binary robust invariant scalable keypoints (BRISK), oriented FAST and rotated BRIEF (ORB), or compact and real-time descriptors (CARD).

The wind shake characteristic calculating unit 118 outputs the calculated wind shake characteristic value and the sensor data acquired from the altitude sensor 14 to the landing possibility and approach determining unit 116.

(Step S104: Does Altitude Exceed Threshold Value?)

FIGS. 5 and 6 are graphs each showing an example of a determination index as to whether to land the drone aircraft 10 on the landing surface. The landing possibility and approach determining unit 116 reads the discrimination indices (FIGS. 5 and 6) corresponding to the environment of the landing surface imaged by the camera 13 on the basis of the discrimination result of the environment discriminating unit 117, and determines whether or not the wind shake characteristic value acquired from the wind shake characteristic calculating unit 118 and the sensor data (the altitude of the drone aircraft 10 from the landing surface) acquired from the altitude sensor 14 exceed a predetermined threshold value with reference to the discrimination indices.

Here, if the altitude of the drone aircraft 10 exceeds threshold values L1 and L3 corresponding to the environment of the landing surface, which is discriminated in the previous Step 102, (YES in Step S104), the camera 13 has difficulty of satisfactorily image the landing surface. Further, the wind pressure of the propellers of the drone aircraft 10 cannot be sufficiently transmitted to the landing surface, and thus the landing possibility and approach determining unit 116 outputs an instruction to the action generating unit 119 to cause the drone aircraft 10 to approach the landing surface to a predetermined altitude (Step S105). In response to the instruction from the landing possibility and approach determining unit 116, the action generating unit 214 controls the rotational speed of the motor 16 via the flight controller 15. Thus, the drone aircraft 10 approaches the landing surface to a preset altitude and hovers while maintaining the altitude equal to or less than the threshold values L1 and L3. Next, the control unit 11 executes Steps S101 to S104 again while the drone aircraft 10 is hovering at an altitude equal to or less than the threshold values L1 and L3.

On the other hand, if the altitude of the drone aircraft 10 is equal to or less than the threshold values L1 and L3 (NO in Step S104), the control unit 11 executes Step S106 to be described later.

(Step S106: Is Landing Possible?)

The landing possibility and approach determining unit 116 determines whether to land the drone aircraft 10 on the landing surface on the basis of the environment of the landing surface, which is discriminated by the environment discriminating unit 117 and the wind shake characteristic value calculated by the wind shake characteristic calculating unit 118. Hereinafter, some determination examples corresponding to each environment of the landing surface will be described.

Determination Example 1: If the Environment of the Landing Surface is a Rocky or Sandy Ground If the environment of the landing surface discriminated in the preceding Step S102 is a rocky ground, and the wind shake characteristic value calculated in the preceding Step S103 is equal to or less than a threshold value L2 corresponding to a rocky ground (NO in Step S106), the landing possibility and approach determining unit 116 determines that the environment of the landing surface is an environment in which the shape of the landing surface does not change much even if the landing surface receives a sufficient wind pressure from the drone aircraft 10.

Therefore, if the drone aircraft 10 is landed on the landing surface in such an environment, the drone aircraft 10 may fall and be damaged because the landing surface does not completely absorb the landing shock. Thus, the landing possibility and approach determining unit 116 outputs an instruction not to land the drone aircraft 10 on the landing surface to the action generating unit 119.

In response to the instruction from the landing possibility and approach determining unit 116, the action generating unit 119 notifies the UI 30 of the fact that the drone aircraft 10 cannot be landed on the landing surface, and controls the rotational speed of the motor 16 via the flight controller 15. This maintains the drone aircraft 10 hovering at an altitude equal to or less than the threshold value L1 (Step S108).

On the other hand, if the environment of the landing surface discriminated in the preceding Step S102 is a sandy ground and the wind shake characteristic value calculated in the preceding Step S103 exceeds the threshold value L2 corresponding to a sandy ground (YES in Step S106), the landing possibility and approach determining unit 116 determines that the environment of the landing surface is an environment in which the landing shock is absorbed in the landing surface when the drone aircraft 10 is landed on the landing surface. Therefore, the landing possibility and approach determining unit 116 outputs an instruction to land the drone aircraft 10 on the landing surface to the action generating unit 119 (Step S107).

In response to the instruction from the landing possibility and approach determining unit 116, the action generating unit 119 notifies the UI 30 of the landing of the drone aircraft 10 on the landing surface, and controls the rotational speed of the motor 16 via the flight controller 15. As a result, the drone aircraft 10 lands on the landing surface.

Determination Example 2: If the Environment of the Landing Surface is a Grass Field or where Metal is Stacked on the Landing Surface If the environment of the landing surface discriminated in the preceding Step S102 is an environment in which metal such as wire is stacked on the landing surface, and the wind shake characteristic value calculated in the preceding Step S103 is equal to or less than the threshold value L2 corresponding to such an environment (NO in Step S106), the landing possibility and approach determining unit 116 determines that the environment of the landing surface is an environment in which the metal stack does not change much even if the landing surface receives a sufficient wind pressure from the drone aircraft 10.

Therefore, if the drone aircraft 10 is landed on the landing surface in such an environment, the drone aircraft 10 may fall and be damaged. Thus, the landing possibility and approach determining unit 116 outputs an instruction not to land the drone aircraft 10 on the landing surface to the action generating unit 119.

In response to the instruction from the landing possibility and approach determining unit 116, the action generating unit 119 notifies the UI 30 of the fact that the drone aircraft 10 cannot be landed on the landing surface, and controls the rotational speed of the motor 16 via the flight controller 15. This maintains the drone aircraft 10 hovering at an altitude equal to or less than the threshold value L1 (Step S108).

On the other hand, if the environment of the landing surface discriminated in the preceding Step S102 is a grass field and the wind shake characteristic value calculated in the preceding Step S103 exceeds the threshold value L2 corresponding to a grass field (YES in Step S106), the landing possibility and approach determining unit 116 determines that the environment of the landing surface is an environment in which the landing shock is absorbed in the landing surface when the drone aircraft 10 is landed on the landing surface. Therefore, the landing possibility and approach determining unit 116 outputs an instruction to land the drone aircraft 10 on the landing surface to the action generating unit 119 (Step S107).

In response to the instruction from the landing possibility and approach determining unit 116, the action generating unit 214 notifies the UI 30 of the landing of the drone aircraft 10 on the landing surface, and controls the rotational speed of the motor 16 via the flight controller 15. As a result, the drone aircraft 10 lands on the landing surface.

Determination Example 3: If the Environment of the Landing Surface is where Paper is Stacked on the Landing Surface If the environment of the landing surface discriminated in the preceding Step S102 is an environment in which desk trays or paper file boxes are stacked, and the wind shake characteristic value calculated in the preceding Step S103 is equal to or less than the threshold value L2 corresponding to such an environment (NO in Step S106), the landing possibility and approach determining unit 116 determines that the environment of the landing surface is an environment in which the paper stack does not change much even if the landing surface receives a sufficient wind pressure from the drone aircraft 10.

Therefore, if the drone aircraft 10 is landed on the landing surface in such an environment, the drone aircraft 10 may fall and be damaged. Thus, the landing possibility and approach determining unit 116 outputs an instruction not to land the drone aircraft 10 on the landing surface to the action generating unit 119.

In response to the instruction from the landing possibility and approach determining unit 116, the action generating unit 119 notifies the UI 30 of the fact that the drone aircraft 10 cannot be landed on the landing surface, and controls the rotational speed of the motor 16 via the flight controller 15. This maintains the drone aircraft 10 hovering at an altitude equal to or less than the threshold value L1 (Step S108).

On the other hand, if the environment of the landing surface discriminated in the preceding Step S102 is an environment in which paper such as flyers or the deformation thereof is stacked, and the wind shake characteristic value calculated in the preceding Step S103 exceeds the threshold value L2 corresponding to such an environment (YES in Step S106), the landing possibility and approach determining unit 116 determines that the environment of the landing surface is an environment in which the landing shock is absorbed in the landing surface when the drone aircraft 10 is landed on the landing surface. Therefore, the landing possibility and approach determining unit 116 outputs an instruction to land the drone aircraft 10 on the landing surface to the action generating unit 119 (Step S107).

In response to the instruction from the landing possibility and approach determining unit 116, the action generating unit 119 notifies the UI 30 of the landing of the drone aircraft 10 on the landing surface, and controls the rotational speed of the motor 16 via the flight controller 15. As a result, the drone aircraft 10 lands on the landing surface.

Determination Example 4: If the Environment of the Landing Surface is a Water Surface or a Floor with a Water Surface Pattern If the environment of the landing surface discriminated in the preceding Step S102 is a water surface and the wind shake characteristic value calculated in the preceding Step S103 exceeds a threshold value L4 corresponding to the water surface (NO in Step S106), the landing possibility and approach determining unit 116 outputs an instruction not to land the drone aircraft 10 on the landing surface to the action generating unit 119, because if the drone aircraft 10 is landed on the landing surface in such an environment, the drone aircraft 10 may be submerged and damaged.

In response to the instruction from the landing possibility and approach determining unit 116, the action generating unit 119 notifies the UI 30 of the fact that the drone aircraft 10 cannot be landed on the landing surface, and controls the rotational speed of the motor 16 via the flight controller 15. This maintains the drone aircraft 10 hovering at an altitude equal to or less than the threshold value L3 (Step S108).

On the other hand, if the environment of the landing surface discriminated in the preceding Step S102 is a water surface, and the wind shake characteristic value calculated in the preceding Step S103 is equal to or less than the threshold value L4 corresponding to the water surface (YES in Step S106), the landing possibility and approach determining unit 116 determines that the environment of the landing surface is a floor with a water surface pattern.

Therefore, since the drone aircraft 10 is not submerged even if the drone aircraft 10 is landed on the landing surface of such an environment, the landing possibility and approach determining unit 116 outputs an instruction to land the drone aircraft 10 on the landing surface to the action generating unit 119 (Step S107).

In response to the instruction from the landing possibility and approach determining unit 116, the action generating unit 119 notifies the UI 30 of the landing of the drone aircraft 10 on the landing surface, and controls the rotational speed of the motor 16 via the flight controller 15. As a result, the drone aircraft 10 lands on the landing surface.

[Actions and Effects]

Heretofore, opportunities to utilize the drone aircraft have been increased in the case of, for example, aerial shooting of a landscape or the like. It can be easily anticipated that the development environment of the drone aircraft is progressed in the future, and thus a drone aircraft that flies autonomously without an operator or a drone aircraft capable of being remotely controlled will appear.

In such a drone aircraft, the operator is not nearby or is not present, and thus the drone aircraft itself needs to determine whether the drone aircraft can land on the landing surface in order to prevent the battery from being depleted and the drone aircraft from falling, for example, when the battery level is low and emergency landing must be performed. Therefore, it is indispensable for an autonomous flying drone aircraft or a remotely controllable drone aircraft to adopt a technique for accurately determining whether or not landing is possible on the landing surface in order to prevent damage. such a technique is desired even for the current drone aircraft.

Therefore, in view of the circumstances described above, a technique for determining whether or not the drone aircraft can land on the landing surface from image information of the landing surface has been used in recent years. In such a technique, however, it is necessary to determine whether to land the drone aircraft only from the image information of the landing surface, and this determination may be erroneously made.

On the other hand, the drone aircraft 10 according to the embodiment calculates the wind shake characteristic value of the landing surface from the images in which the landing surface is imaged in time series by the camera 13, and determines whether to land on the landing surface on the basis of the calculated wind shake characteristic value.

Thus, it is determined whether or not the drone aircraft 10 is to be landed on the landing surface in consideration of not only the image in which the landing surface is imaged, but also a temporal change in the physical shape of the landing surface (for example, softness of the landing surface). Therefore, the accuracy of the determination on whether landing is possible for preventing damage to the drone aircraft is improved as compared with the determination based only on the image information of the landing surface.

Further, if the altitude exceeds the threshold value corresponding to the environment of the landing surface, the drone aircraft 10 executes control for approaching the landing surface. Thus, even if the environment of the landing surface is windless, the wind pressure from the drone aircraft 10 is transmitted to the landing surface, so that the wind shake characteristic value of the landing surface can be calculated. Therefore, since the drone aircraft 10 can calculate the wind shake characteristic value of the landing surface in any environment of the landing surface, the drone aircraft 10 can accurately determine whether or not landing is possible in order to prevent the damage thereof regardless of the environment of the landing surface.

Second Embodiment

Figure 7:
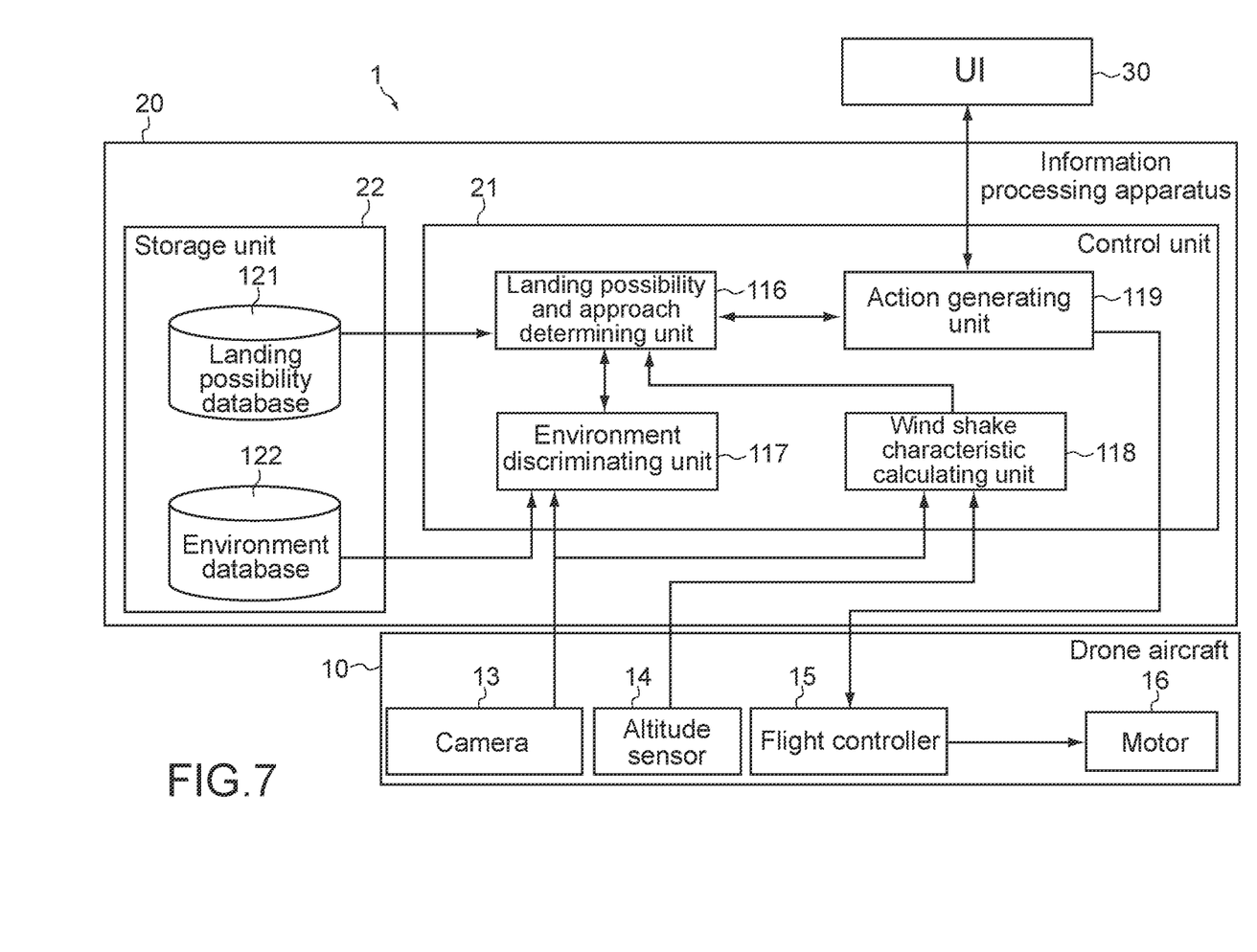
FIG. 7 is a block diagram showing a configuration example of a drone aircraft according to a second embodiment of the present technology.

FIG. 7 is a block diagram showing a configuration example of an information processing system 2 according to a second embodiment. Hereinafter, the components similar to those of the first embodiment will be denoted by similar reference numerals, and the description thereof will be omitted or simplified.

The information processing system 2 according to the second embodiment is different from that of the first embodiment in that an information processing apparatus 20 determines whether to land a drone aircraft 10 on a landing surface.

[Configuration of Information Processing System]

As shown in FIG. 7, the information processing system 2 includes a drone aircraft 10, an information processing apparatus 20, and a UI 30. The information processing apparatus 20 is typically a server apparatus, but is not limited thereto, and may be any other computer such as a PC.

The information processing apparatus 20 includes a control unit 21 and a storage unit 22. The control unit 21 controls the overall operation of the information processing apparatus 20 or part thereof according to programs stored in the storage unit 22.

The control unit 21 functionally includes a landing possibility and approach determining unit 116, an environment discriminating unit 117, a wind shake characteristic calculating unit 118, and an action generating unit 119.

The storage unit 22 functionally includes a landing possibility database 121 and an environment database 122.

[Operation of Information Processing Apparatus]

The information processing apparatus 20 according to the second embodiment performs an operation according to the flowchart shown in FIG. 4. Note that the information processing system 2 operates in the same manner as in the first embodiment except that the information processing apparatus 20 executes Steps S101 to S108, and thus detailed description thereof will be omitted.

[Actions and Effects]

In the information processing system 2 of the second embodiment, the information processing apparatus 20 determines whether to land the drone aircraft 10 on the landing surface. In other words, in order to avoid the damage of the drone aircraft 10, the information processing apparatus 20 performs part of the arithmetic processing executed by the drone aircraft 10. Thus, the arithmetic load of the drone aircraft 10 can be greatly reduced. Furthermore, since it is not necessary to increase the arithmetic processing capacity of the drone aircraft 10, a design cost of the drone aircraft 10 is suppressed.

<Modifications>

Although the embodiments of the present technology have been described above, the present technology is not limited thereto, and of course various modifications may be made thereto.

For example, in the embodiments described above, the feature point of the landing surface is detected from the image in which the landing surface is imaged, and the temporal change of the detected feature point is calculated as the wind shake characteristic value of the landing surface, but the present technology is not limited thereto. For example, the temporal change of a pixel value of the image in which the landing surface is imaged may be calculated as the wind shake characteristic value of the landing surface.

<Supplement>

In the embodiments described above, the description has been made on the assumption that the drone aircraft 10 is a flying object, but the present technology is not limited thereto. The present technology may be applied to other mobile objects other than a flying object, and its application is not particularly limited. Note that the flying object may include an aircraft, an unmanned airplane, an unmanned helicopter, or the like in addition to the drone aircraft.

In addition, the effects described herein are illustrative or exemplary only and not restrictive. In other words, the present technology may provide other effects apparent to those skilled in the art from the description herein, in addition to or instead of the effects described above.

Although the suitable embodiments of the present technology have been described in detail above with reference to the accompanying drawings, the present technology is not limited to such an example. It is clear that persons who have common knowledge in the technical field of the present technology could conceive various alterations or modifications within the scope of the technical idea described in the Claims. It is understood that of course such alterations or modifications also fall under the technical scope of the present technology.

Note that the present technology can have the following configurations.

(1) A mobile object, including
a control unit that
calculates a temporal change of a landing surface from images in which the landing surface for the mobile object is imaged in time series by an imaging unit of the mobile object in a hovering state, and
determines whether to land the mobile object on the landing surface on the basis of the calculated temporal change.

(2) The mobile object according to (1), further including
a detection unit that detects an altitude of the mobile object from the landing surface, in which
the control unit determines whether to land the mobile object on the landing surface on the basis of the altitude and the temporal change.

(3) The mobile object according to (1) or (2), in which
the control unit
performs image processing on the images to remove objects different from the landing surface, and
calculates the temporal change from the images on which the image processing is performed.

(4) The mobile object according to (2), in which
the control unit causes the mobile object to approach the landing surface when the altitude of the mobile object is larger than a predetermined threshold value.

(5) The mobile object according to (4), in which
the threshold value is an altitude at which the landing surface changes with time due to wind generated from the mobile object.

(6) The mobile object according to (4) or (5), in which
the control unit
discriminates an environment of the landing surface on the basis of the images, and
determines whether to land the mobile object on the landing surface on the basis of the discriminated environment, the temporal change, and the altitude.

(7) The mobile object according to (6), in which
the control unit lands the mobile object on the landing surface when the temporal change exceeds a threshold value corresponding to the discriminated environment.

(8) The mobile object according to (6), in which
the control unit lands the mobile object on the landing surface when the discriminated environment is a water surface and when the temporal change is equal to or less than a threshold value corresponding to the water surface.

(9) The mobile object according to any one of (1) to (8), in which the mobile object is a flying object.

(10) An information processing apparatus, including
a control unit that
calculates a temporal change of a landing surface from images in which the landing surface for a mobile object is imaged in time series by an imaging unit of the mobile object in a hovering state,
determines whether to land the mobile object on the landing surface on the basis of the calculated temporal change, and
outputs a result of the determination to the mobile object.

(11) The information processing apparatus according to (10), in which
the information processing apparatus is a server.

(12) An information processing method, including:
  calculating a temporal change of a landing surface from images in which the landing surface for a mobile object is imaged in time series by an imaging unit of the mobile object in a hovering state; and
  determining whether to land the mobile object on the landing surface on the basis of the calculated temporal change.
(13) A program causing a mobile object or an information processing apparatus to execute the steps of:
  calculating a temporal change of a landing surface from images in which the landing surface for the mobile object is imaged in time series by an imaging unit of the mobile object in a hovering state; and
  determining whether to land the mobile object on the landing surface on the basis of the calculated temporal change.

REFERENCE SIGNS LIST information processing system 1, 2
drone aircraft 10
information processing apparatus 20, 100
UI 30

The invention claimed is:
1. A mobile object, comprising
  a control unit configured to
    calculate a temporal change of a landing surface from images in which the landing surface for the mobile object is imaged in time series by a camera of the mobile object in a hovering state,
    discriminate an environment of the landing surface on a basis of the images, and
    cause the mobile object to land on the landing surface on a basis of the calculated temporal change exceeding a threshold value corresponding to the discriminated environment, wherein
  different threshold values correspond to respective different discriminated environments, and
  the control unit is implemented via at least one processor.
2. The mobile object according to claim 1, further comprising
  a detection unit configured to detect an altitude of the mobile object from the landing surface, wherein
  the control unit is further configured to determine whether to land the mobile object on the landing surface on a basis of the altitude and the temporal change, and
  the detection unit is implemented via at least one processor.
3. The mobile object according to claim 2, wherein
  the control unit is further configured to cause the mobile object to approach the landing surface when the altitude of the mobile object is larger than a predetermined threshold value.
4. The mobile object according to claim 3, wherein
  the threshold value is an altitude at which the landing surface changes with time due to wind generated from the mobile object.
5. The mobile object according to claim 3, wherein
  the control unit is further configured to
    determine whether to land the mobile object on the landing surface on a basis of the discriminated environment, the temporal change, and the altitude.
6. The mobile object according to claim 5, wherein
  the control unit is further configured to cause the mobile object to land on the landing surface based on the discriminated environment being a water surface and the temporal change being equal to or less than a threshold value corresponding to the water surface.
7. The mobile object according to claim 1, wherein
  the control unit is further configured to
    perform image processing on the images to remove objects different from the landing surface, and
    calculate the temporal change from the images on which the image processing is performed.
8. The mobile object according to claim 1, wherein
  the mobile object is a flying object.
9. The mobile object according to claim 1, wherein
  the control unit is further configured to
    control the mobile object to land on the landing surface on a basis of the calculated temporal change exceeding a first threshold value corresponding a first discriminated environment, and
    control the mobile object to land on the landing surface on a basis of the calculated temporal change exceeding a second threshold value corresponding a second discriminated environment, and
  the first threshold value is different than the second threshold value and the first discriminated environment is different than the second discriminated environment.
10. An information processing apparatus, comprising
  a control unit configured to
    calculate a temporal change of a landing surface from images in which the landing surface for a mobile object is imaged in time series by a camera of the mobile object in a hovering state,
    discriminate an environment of the landing surface on a basis of the images,
    cause the mobile object to land on the landing surface on a basis of the calculated temporal change exceeding a threshold value corresponding to the discriminated environment, and
    output a result of the determination to the mobile object, wherein
  different threshold values correspond to respective different discriminated environments, and
  the control unit is implemented via at least one processor.
11. The information processing apparatus according to claim 10, wherein
  the information processing apparatus is a server.
12. An information processing method, comprising:
  calculating a temporal change of a landing surface from images in which the landing surface for a mobile object is imaged in time series by a camera of the mobile object in a hovering state;
  discriminating an environment of the landing surface on a basis of the images; and
  causing the mobile object to land on the landing surface on a basis of the calculated temporal change exceeding a threshold value corresponding to the discriminated environment, wherein
  different threshold values correspond to respective different discriminated environments.
13. A non-transitory computer-readable medium having embodied thereon a program, which when executed by a computer causes the computer to execute an information processing method, the method comprising:
  calculating a temporal change of a landing surface from images in which the landing surface for a mobile object is imaged in time series by a camera of the mobile object in a hovering state;
  discriminating an environment of the landing surface on a basis of the images; and causing the mobile object to land on the landing surface on a basis of the calculated temporal change exceeding a threshold value corresponding to the discriminated environment, wherein
different threshold values correspond to respective different discriminated environments.

* * * * *